United States Patent
Simkulak et al.

(10) Patent No.: US 10,351,229 B2
(45) Date of Patent: Jul. 16, 2019

(54) METALLIC DIMPLED DOUBLER

(71) Applicant: Sikorsky Aircraft Corporation, Stratford, CT (US)

(72) Inventors: Richard Joseph Simkulak, Meriden, CT (US); Michael J. Shimkus, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 416 days.

(21) Appl. No.: 15/303,674

(22) PCT Filed: Mar. 12, 2015

(86) PCT No.: PCT/US2015/020183
§ 371 (c)(1),
(2) Date: Oct. 12, 2016

(87) PCT Pub. No.: WO2015/187224
PCT Pub. Date: Dec. 10, 2015

(65) Prior Publication Data
US 2017/0057627 A1    Mar. 2, 2017

Related U.S. Application Data

(60) Provisional application No. 61/993,749, filed on May 15, 2014.

(51) Int. Cl.
*B64C 27/46* (2006.01)
*B64C 27/473* (2006.01)

(52) U.S. Cl.
CPC .......... *B64C 27/463* (2013.01); *B64C 27/473* (2013.01); *B64C 2027/4733* (2013.01); *B64C 2027/4736* (2013.01); *Y02E 10/721* (2013.01)

(58) Field of Classification Search
CPC ....... B64C 27/463; B64C 27/473; B64C 1/06; B64C 1/064; B64C 1/065; B64C 1/068; B64C 1/069; B64C 1/12
See application file for complete search history.

(56) References Cited

U.S. PATENT DOCUMENTS

| | | | |
|---|---|---|---|
| 2,629,567 A * | 2/1953 | Papadakos | B64C 13/30 244/17.13 |
| 2,884,077 A * | 4/1959 | Stamm | B64C 27/473 29/889.72 |

(Continued)

FOREIGN PATENT DOCUMENTS

DE    20217764 U1    1/2003

OTHER PUBLICATIONS

International Search Report and Written Opinion issued in related PCT Application No. PCT/US2015/020183 dated Feb. 1, 2016, 10 pages.

(Continued)

*Primary Examiner* — Woody A Lee, Jr.
(74) *Attorney, Agent, or Firm* — Cantor Colburn LLP

(57) ABSTRACT

A rotor blade is provided. The rotor blade includes a blade portion, a tip cap formed to define a dimple, a fastener and a doubler. The fastener includes a flat-headed shaft and is disposable such that the flat-headed shaft extends through the blade portion and the tip cap at the dimple. The fastener is configured to urge the blade portion toward the tip cap. The doubler includes a dimpled portion disposable between the tip cap and a portion of the flat-headed shaft at the dimple and an exterior portion. The exterior portion is disposable flush with respective exterior surfaces of the blade portion and the flat-headed shaft.

15 Claims, 5 Drawing Sheets

(56) References Cited

U.S. PATENT DOCUMENTS

| | | | |
|---|---|---|---|
| 3,000,445 A | | 9/1961 | Warnken |
| 3,239,011 A | * | 3/1966 | Brownlee ............ B64C 27/473 |
| | | | 416/226 |
| 3,721,507 A | | 3/1973 | Monteleone |
| 4,120,610 A | | 10/1978 | Braswell et al. |
| 5,297,760 A | * | 3/1994 | Hart-Smith ............ B64C 1/068 |
| | | | 244/132 |
| 5,320,494 A | | 6/1994 | Reinfelder et al. |
| 5,885,059 A | | 3/1999 | Kovalsky et al. |
| 6,024,325 A | | 2/2000 | Carter, Jr. |
| 6,374,570 B1 | * | 4/2002 | McKague, Jr. ......... B29C 65/56 |
| | | | 52/762 |
| 6,976,829 B2 | | 12/2005 | Kovalsky et al. |
| 7,758,312 B2 | | 7/2010 | Leahy |
| 7,762,785 B2 | | 7/2010 | Leahy et al. |
| 7,771,173 B2 | | 8/2010 | Leahy |
| 7,857,258 B2 | * | 12/2010 | Normand ................ B64C 1/069 |
| | | | 244/120 |
| 7,909,290 B2 | * | 3/2011 | Cooper ..................... B64C 3/26 |
| | | | 244/123.1 |
| 8,353,673 B2 | | 1/2013 | Leahy et al. |
| 2004/0222329 A1 | | 11/2004 | Kuhns |
| 2009/0148301 A1 | * | 6/2009 | Leahy .................. B64C 27/463 |
| | | | 416/223 R |
| 2009/0148302 A1 | | 6/2009 | Leahy et al. |
| 2010/0008788 A1 | | 1/2010 | Barbee et al. |
| 2010/0296939 A1 | | 11/2010 | Jevons |
| 2011/0243736 A1 | * | 10/2011 | Bell ...................... F03D 1/0675 |
| | | | 416/132 R |

OTHER PUBLICATIONS

Search Report dated Dec. 20, 2017 in European Application No. 15802653.4.

\* cited by examiner

METALLIC DIMPLED DOUBLER

CROSS-REFERENCE TO RELATED APPLICATIONS

The present application is a 371 National Stage of International Application No. PCT/US2015/020183, filed on Mar. 12, 2015, which claims priority to U.S. Provisional Application No. 61/993,749, filed on May 15, 2014, the contents of which are incorporated by reference herein in their entirely.

FEDERAL RESEARCH STATEMENT

This invention was made with government support with the United States Navy under Contract No. N00019-06-C-0081. The government therefore has certain rights in this invention.

BACKGROUND OF THE INVENTION

The subject matter disclosed herein relates to a metallic dimpled doubler and, more particular, to a metallic dimpled doubler for use with a tip cap of a rotor blade.

An aircraft, such as a helicopter of any type, typically includes an airframe formed to define a cabin that accommodates a pilot and, in some cases, one or more crewmen and passengers, one or more main rotors provided at an upper portion of the airframe and a tail rotor or propeller provided at a tail portion of the airframe. The aircraft further includes an engine and a transmission system. The engine generates torque and the transmission system transmits the torque from the engine to the one or more main rotors and the tail rotor or propeller. This torque drives rotations of the one or more main rotors and the tail rotor or propeller relative to the airframe for flight control of the aircraft.

Each of the one or more main rotors and the tail rotor or propeller includes a rotor shaft coupled to the engine via the transmission, a hub connected to an end of the rotor shaft and rotor blades extending outwardly from the hub. Each rotor blade includes an airfoil-shaped portion and a blade tip.

BRIEF DESCRIPTION OF THE INVENTION

According to one aspect of the invention, a rotor blade is provided. The rotor blade includes a blade portion, a tip cap formed to define a dimple, a fastener and a doubler. The fastener includes a flat-headed shaft and is disposable such that the flat-headed shaft extends through the blade portion and the tip cap at the dimple. The fastener is configured to urge the blade portion toward the tip cap. The doubler includes a dimpled portion disposable between the tip cap and a portion of the flat-headed shaft at the dimple and an exterior portion. The exterior portion is disposable flush with respective exterior surfaces of the blade portion and the flat-headed shaft.

In accordance with additional or alternative embodiments, the blade portion encases a core material.

In accordance with additional or alternative embodiments, the blade portion includes a main blade portion and a distal blade portion, which is recessed from the main blade portion.

In accordance with additional or alternative embodiments, the flat-headed shaft extends through the distal blade portion.

In accordance with additional or alternative embodiments, the exterior portion of the doubler is disposable flush with an exterior surface of the main blade portion.

In accordance with additional or alternative embodiments, the dimple, the fastener and the dimpled portion are correspondingly plural in number.

In accordance with additional or alternative embodiments, the adjacent ones of the plural fasteners are staggered.

In accordance with additional or alternative embodiments, the doubler includes metallic materials.

In accordance with additional or alternative embodiments, the rotor blade further includes sealant disposable between the blade portion and the tip cap and between the blade portion and the doubler.

In accordance with additional or alternative embodiments, the rotor blade further includes an erosion strip disposable flush with the doubler exterior portion and with the respective exterior surfaces of the blade portion and the flat-headed shaft.

According to another aspect of the invention, a doubler for a blade is provided. The doubler includes a first planar section including an exterior portion defining a first plane and a dimpled portion at which a fastener including a flat-headed shaft is disposable to extend through a portion of the blade and a tip cap with an exterior surface of the flat-headed shaft flush with the exterior portion, a second planar section disposed beyond a periphery of the first planar section and defining a second plane and a tapered section interposed between the periphery of the first planar section and the second planar section. The tapered section is tapered from the first plane to the second plane.

In accordance with additional or alternative embodiments, the dimpled portion includes a frusto-conical ramp tapered away from the first plane in a same direction as tapering of the tapered section.

In accordance with additional or alternative embodiments, the first and second planar sections and the tapered section comprise metallic materials.

In accordance with additional or alternative embodiments, the dimpled portion is plural in number, the plural dimpled portions being aligned with one another.

According to yet another aspect of the invention, a blade including upper and lower surface doublers in accordance with the above-described doubler is provided. The plural dimpled portions of the upper surface doubler are staggered with respect to the plural dimpled portions of the lower surface doubler.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1A:
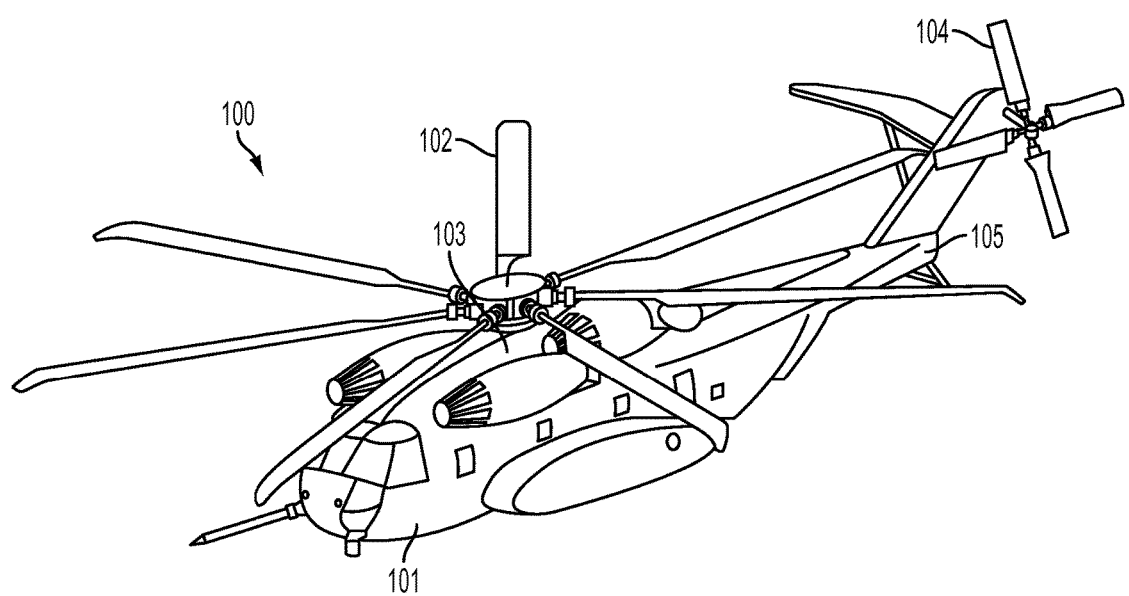
FIG. 1A is a side view of an example of a rotary wing aircraft.
Figure 1B:
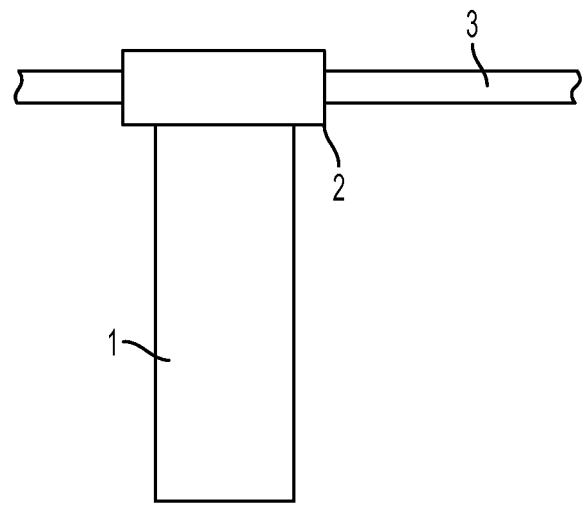
FIG. 1B is a schematic side view of a portion of an aircraft rotor in accordance with embodiments.

The detailed description explains embodiments of the invention, together with advantages and features, by way of example with reference to the drawings.

DETAILED DESCRIPTION OF THE INVENTION

Tip caps of blade tips of aircraft rotor blades can be installed and bolted in place using protruding fasteners or countersunk screws. Both solutions can be problematic and, as will be described below, a metallic dimpled doubler is provided to form a flush surface and to prevent countersunk screws from wearing into a composite tip cap during repeated cyclic loading of the tip ends of aircraft rotor blades. With reference to FIGS. 1A-4, an aircraft 100, such as a helicopter of any type, typically includes an airframe 101 formed to define a cabin that accommodates a pilot and, in some cases, one or more crewmen and passengers, one or more main rotors 102 provided at an upper portion 103 of the airframe 101 and a tail rotor or propeller 104 provided at a tail portion 105 of the airframe 101. The aircraft 100 further includes an engine and a transmission system accommodated within the airframe 101. The engine generates torque and the transmission system transmits the torque from the engine to the one or more main rotors 102 and the tail rotor or propeller 104. This torque drives rotations of the one or more main rotors 102 and the tail rotor or propeller 104 relative to the airframe 101 for flight control of the aircraft 100.

Figure 2:
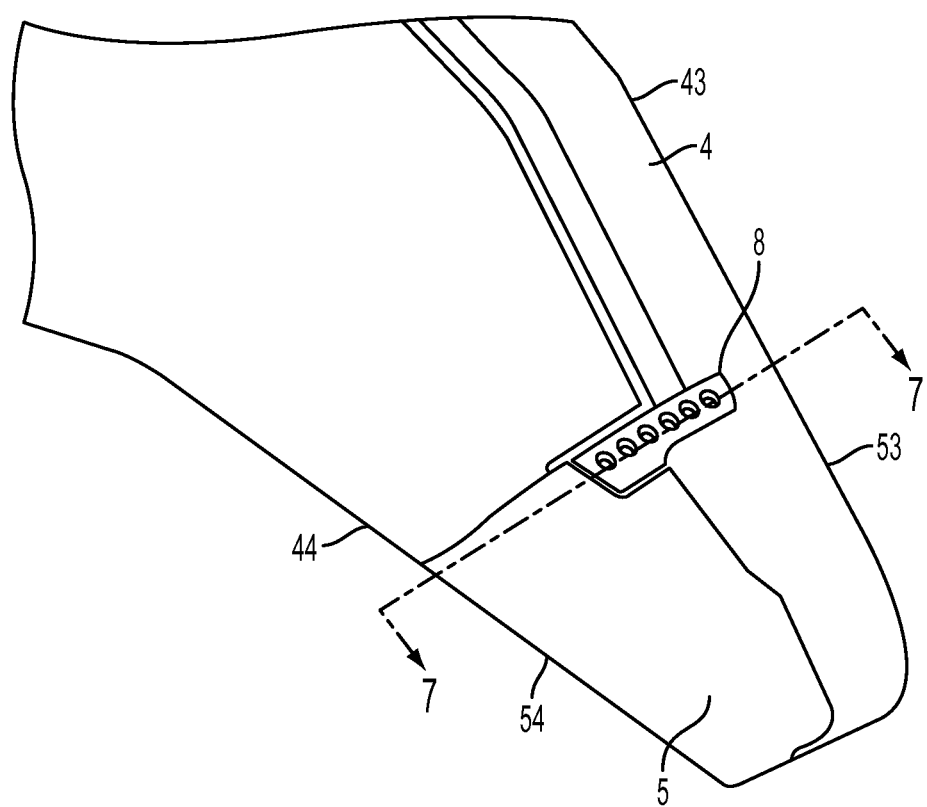
FIG. 2 is a perspective view of a rotor blade of the aircraft rotor of FIG. 1.
Figure 3:
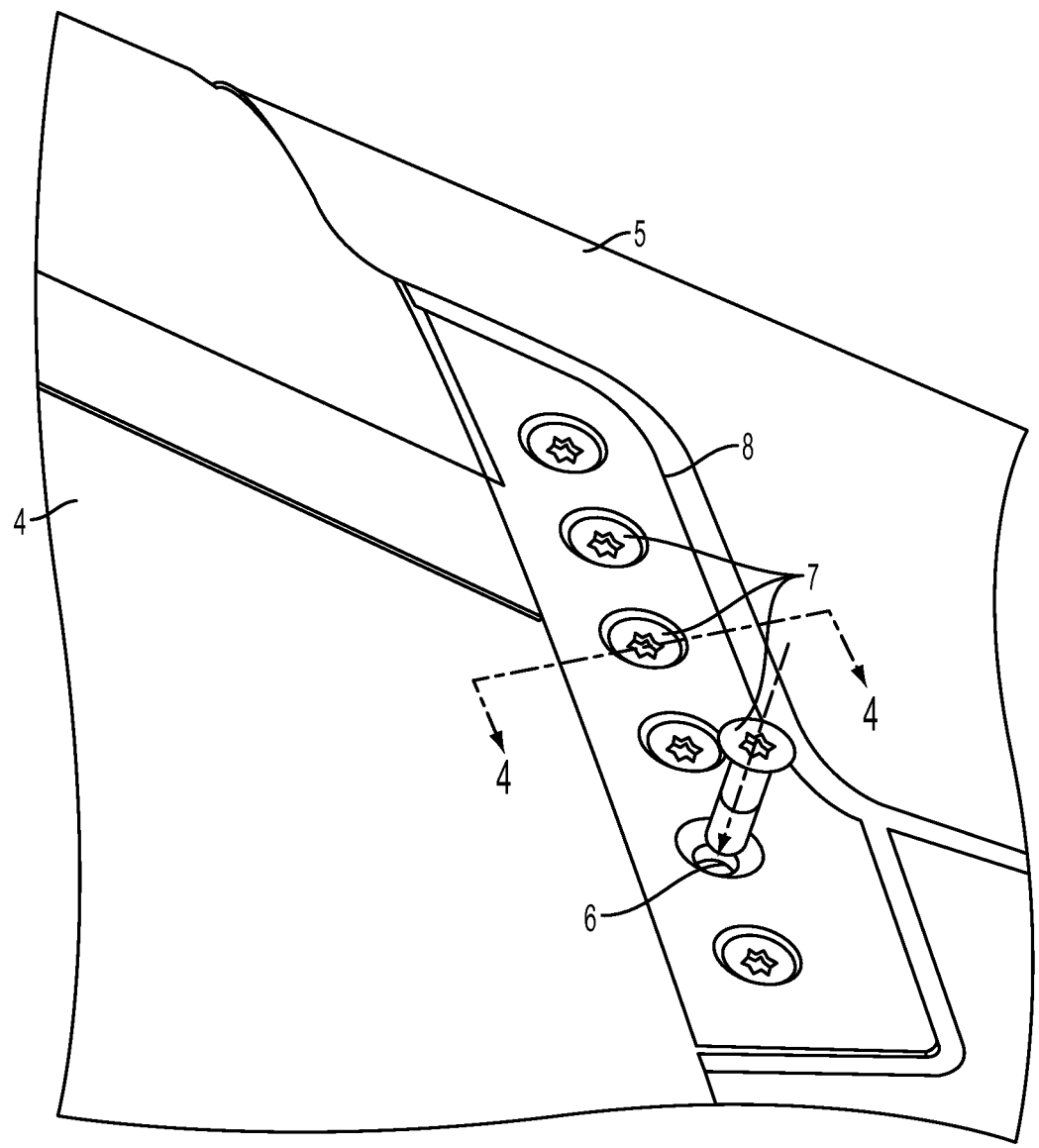
FIG. 3. is an enlarged perspective view of a portion of the rotor blade of FIG. 2.
Figure 4:
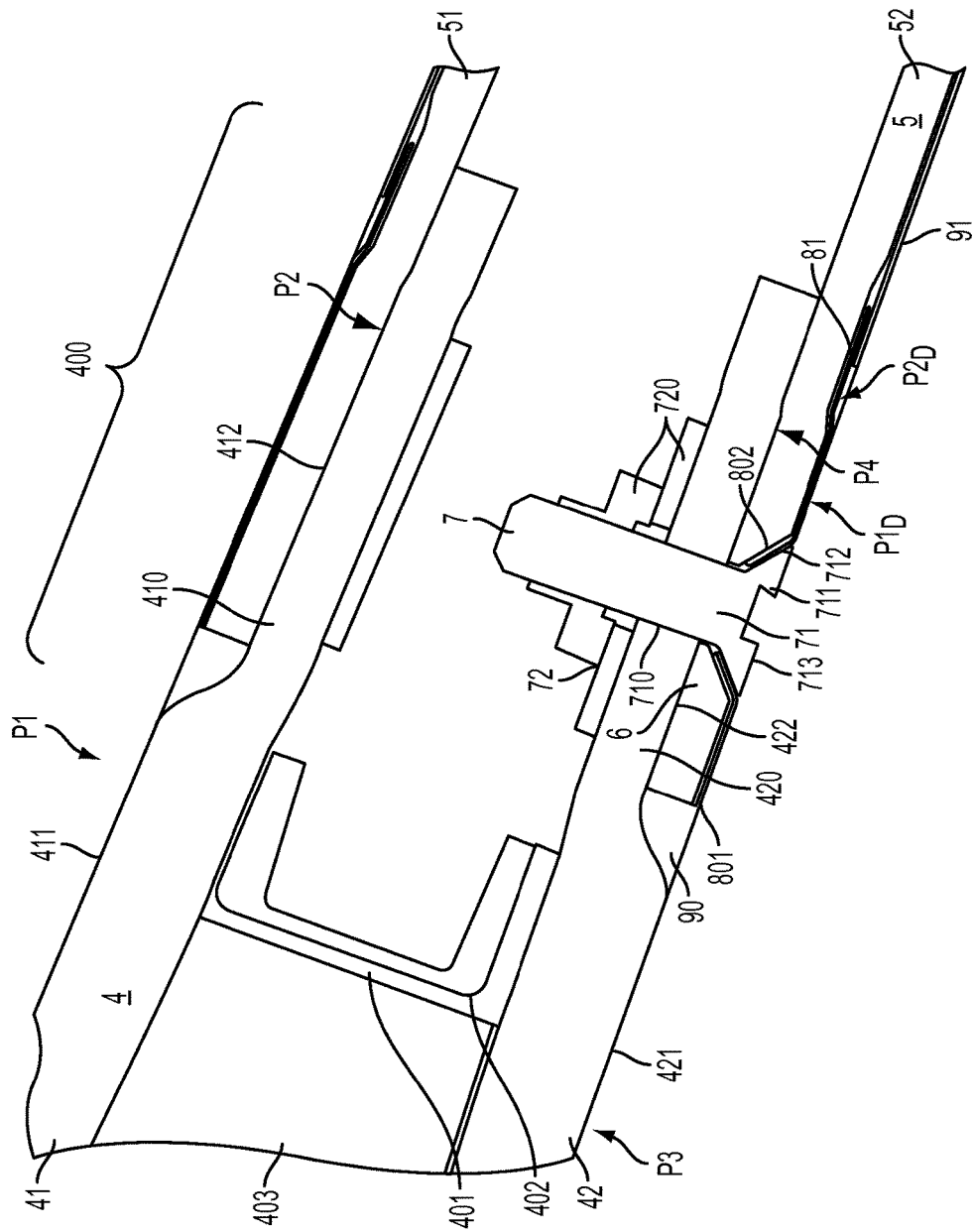
FIG. 4 is a cross-sectional view of the portion of the rotor blade of FIG. 3 taken along line 4-4.

Each of the one or more main rotors 102 and the tail rotor or propeller 104 includes a rotor shaft 1 coupled to the engine via the transmission, a hub 2 connected to an end of the rotor shaft 1 and rotor blades 3. The rotor blades 3 extend radially outwardly from the hub 2. As shown in FIGS. 2-4, each rotor blade 3 includes an airfoil-shaped main blade portion 4, a replaceable blade tip cap 5, which is formed to define a dimple 6, a fastener 7 and a doubler 8. The main blade portion 4 has an upper, suction surface 41 and a lower, pressure surface 42 opposite the upper, suction surface 41 as well as a leading edge 43 and a trailing edge 44 opposite the leading edge 43. The tip cap 5 may be airfoil-shaped like the main blade portion 4 and is disposed at a distal (or radially outward) end of the main blade portion 4.

The main blade portion 4 may include an adhesive element 401 and a core closeout detail 402 such that the main blade portion 4 encases a core material 403 between the upper, suction surface 41 and the lower, pressure surface 42. The core material 403 may be provided as a lightweight feature that increases a structural rigidity of the rotor blades 3 without adding a large amount of weight to the rotor blades 3.

At an interface between the distal end of the main blade portion 4 and the tip cap 5 at a location defined radially beyond the core closeout detail 402, the main blade portion 4 includes a distal blade portion 400. At the distal blade portion 400, the upper, suction surface 41 of the main blade portion 4 includes a first flange 410 and the lower, pressure surface 42 includes a second flange 420. The first flange 410 is recessed axially inwardly from the upper, suction surface 41 such that, where the upper, suction surface 41 has an exterior facing surface 411 that defines a first plane P1, the first flange 410 has an exterior facing surface 412 that defines a second plane P2. The second plane P2 is recessed axially inwardly from the first plane P1. The second flange 420 is recessed axially inwardly from the lower, pressure surface 42 such that, where the lower, pressure surface 42 has an exterior facing surface 421 that defines a third plane P3, the second flange 420 has an exterior facing surface 422 that defines a fourth plane P4. The fourth plane P4 is recessed axially inwardly from the third plane P3.

The tip cap 5 may be formed as a composite element having one or more layers of laminated material. The tip cap 5 includes an upper surface 51 and a lower surface 52 opposite the upper surface 51 as well as a leading edge 53 and a trailing edge 54 opposite the leading edge 53. A portion of the upper surface 51 lies along the exterior facing surface 412 of the first flange 410. A portion of the lower surface 52 lies along the exterior facing surface 422 of the second flange 420.

The fastener 7 includes a flat-headed shaft 71 and a nut 72. The flat-headed shaft 71 includes a shaft portion 710 and a head portion 711 to which the shaft portion 710 is integrally connected. The nut 72 may include gang nut plates 720. The shaft portion 710 is elongate and extends along a longitudinal axis and may include threading on an exterior surface thereof, which complements threading on an interior surface of at least one of the gang nut plates 720. The head portion 711 has a tapered exterior surface 712 leading away from the shaft portion 710 and a planar exterior surface 713.

The fastener 7 is disposable such that the shaft portion 710 of the flat-headed shaft 71 extends through the first or second flange 410 or 420 of the distal blade portion 400 of the main blade portion 4, the corresponding portion of the upper surface 51 or the lower surface 52 of the tip cap 5 and the nut 72 at the location of the dimple 6. The fastener 7 is configured such that relative rotation between the flat-headed shaft 71 and the nut 72 causes or urges the nut 72 to be drawn along the shaft portion 710 and towards the head portion 711 in a tightening direction. This action, in turn, tightens the first or second flange 410 or 420 between the nut 72 and the corresponding portion of the upper surface 51 or the lower surface 52 of the tip cap 5.

While described in terms of using a nut 72 and a shaft 71, it is understood that other types of fasteners can be used in other aspects. By way of example, the nut 72 need not always be used, such as where an interior element is provided to which the shaft 71 is attached. Alternately, the nut 72 could be disposed at the exterior and the shaft 71 at the interior. As such, other types of fasteners can be used in other aspects of the invention.

Figure 5:
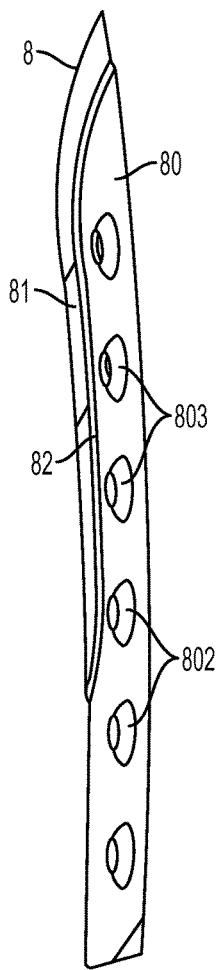
FIG. 5 is a perspective view of a doubler of the rotor blade of FIGS. 2, 3 and 4.
Figure 6:
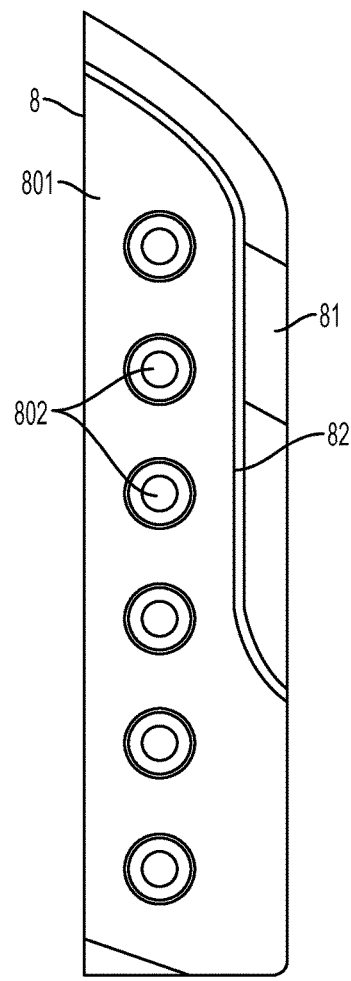
FIG. 6 is a plan view of the doubler of the rotor blade of FIGS. 2, 3 and 4.
Figure 7:
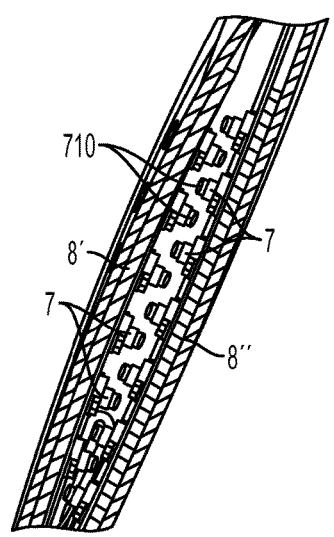
FIG. 7 is a cross-sectional view of the doubler of the rotor blade of FIG. 2 taken along line 7-7.

With continued references to FIGS. 2-4 and with additional reference to FIGS. 5 and 6, the doubler 8 includes a first planar section 80, a second planar section 81 and a tapered section 82. The first planar section 80 includes an exterior surface portion 801 and a dimpled portion 802. The exterior surface portion 801 is disposed around the dimpled portion 802 and defines a first doubler plane $P1_D$. The dimpled portion 802 is disposable to correspond in location to the dimple 6 of the tip cap 5. As such, the dimpled portion 802 is disposable between the tip cap 5 and a portion of the head portion 711 of the flat-headed shaft 71. Thus, the flat-headed shaft 71 may extend through the first or second flange 410 or 420 of the main blade portion 4, the corresponding portion of the upper surface 51 or the lower surface 52 of the tip cap 5, the nut 72 and the dimpled portion 802 of the first planar section 80 of the doubler 8.

The second planar section 81 is disposed beyond a periphery of the first planar section 80 and defines a second doubler plane $P2_D$. The tapered section 82 is interposed between the periphery of the first planar section 80 and the second planar section 81 and is tapered from the first doubler plane $P1_D$ plane to the second doubler plane $P2_D$. The dimpled portion 802 includes a frusto-conical ramp 803 that is tapered away from the first doubler plane $P1_D$ in a same direction as tapering of the tapered section 82. As shown, there are 6 dimpled portions 802, but it is understood that other numbers of dimpled portions 802 can be included according to the number of fasteners 7 needed. Moreover, while shown as being of the same size, it is understood that the dimpled portions 802 can have other sizes according to the varied sizes of the fasteners 7.

The exterior faces of the upper surface 51 and the lower surface 52 of the tip cap 5 may have multiple grooves and landings that each define different respective planes. As shown in FIG. 4, the exterior surface portion 801 of the first planar section 80 of the doubler 8 corresponds in position to a landing of the tip cap 5 proximate to the dimple 6 while the second planar section 81 corresponds in position to a location of a groove of the tip cap 5. As such, the first doubler plane $P1_D$ defined by the exterior surface portion 801 is substantially aligned with the first plane P1 of the exterior facing surface 411 or the third plane P3 of the exterior facing surface 421 and with a plane of the planar exterior surface 713. By contrast, the second doubler plane $P2_D$ is recessed from the first plane P1 or the third plane P3 and from the plane of the planar exterior surface 713. Thus, the exterior surface portion 801 is disposable flush with the exterior facing surface 411 or the exterior facing surface 421 and with the planar exterior surface 713 while the second planar section 81 is recessed from the exterior facing surface 411 or the exterior facing surface 421 and from the planar exterior surface 713.

In accordance with embodiments, the doubler 8 may include metallic materials, such as metals or metallic alloys such as titanium. In addition, as shown in FIG. 4, the rotor blades 3 may further include sealant 90 and an erosion strip 91. The sealant 90 is disposable between the main blade portion 4 and the tip cap 5 and between the main blade portion 4 and the doubler 8. The erosion strip 91 is disposable to lie over a portion of the second planar section 81 of the doubler 8 and a landing of the tip cap 5 remote from the dimple 6. As such, an exterior surface of the erosion strip 91 may lie flush with the exterior surface portion 801, the exterior facing surface 411 or the exterior facing surface 421 and with the planar exterior surface 713.

With reference to FIGS. 3 and 5-7, the dimple 6 of the tip cap 5, the fastener 7 and the dimpled portion 802 of the doubler 8 may be correspondingly plural in number and aligned with one another with adjacent ones of the plural fasteners 7 staggered with respect to one another. More particularly, each rotor blade 3 may include an upper surface doubler 8' and a lower surface doubler 8" that are both similar to the doubler 8 described above. In such cases, the plural dimples 6, the plural fasteners 7 and the plural dimpled portions 802 of the upper surface doubler 8' are staggered with respect to the plural dimples 6, the plural fasteners 7 and the plural dimpled portions 802 of the lower surface doubler 8" such that the respective shaft portions 710 do not interfere with one another.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while shown in the context of a helicopter main rotor, aspects could be used in wings, tail rotors, beams, or other like joined members. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor blade, comprising:
   a blade portion;
   a tip cap formed to define a dimple;
   a fastener including a flat-headed shaft and being disposable such that the flat-headed shaft extends through the blade portion and the tip cap at the dimple, the fastener being configured to urge the blade portion toward the tip cap; and
   a doubler including a dimpled portion disposable between the tip cap and a portion of the flat-headed shaft at the dimple and an exterior portion, which is disposed flush with respective exterior surfaces of the blade portion and the flat-headed shaft.

2. The blade according to claim 1, wherein the blade portion encases a core material.

3. The blade according to claim 1, wherein the blade portion comprises:
   a main blade portion; and
   a distal blade portion recessed from the main blade portion.

4. The blade according to claim 3, wherein the flat-headed shaft extends through the distal blade portion.

5. The blade according to claim 3 wherein the exterior surfaces include an exterior surface of the main blade portion.

6. The blade according to claim 1, wherein the dimple, the fastener and the dimpled portion are correspondingly plural in number.

7. The blade according to claim 6, wherein the adjacent ones of the plural fasteners are staggered.

8. The blade according to claim 1, wherein the doubler comprises metallic materials.

9. The blade according to claim 1, further comprising sealant disposed between the blade portion and the tip cap and between the blade portion and the doubler.

10. The blade according to claim 1, further comprising an erosion strip disposed flush with the doubler exterior portion and with the respective exterior surfaces of the blade portion and the flat-headed shaft.

11. A doubler for a blade, comprising:
    a first planar section including an exterior portion defining a first plane and a dimpled portion at which a fastener including a flat-headed shaft is disposable to extend through a portion of the blade and a tip cap with an exterior surface of the flat-headed shaft flush with the exterior portion;
    a second planar section disposed beyond a periphery of the first planar section and defining a second plane; and
    a tapered section interposed between the periphery of the first planar section and the second planar section, the tapered section being tapered from the first plane to the second plane.

12. The doubler according to claim 11, wherein the dimpled portion comprises a frusto-conical ramp tapered away from the first plane in a same direction as tapering of the tapered section.

13. The doubler according to claim 11, wherein the first and second planar sections and the tapered section comprise metallic materials.

14. The doubler according to claim 11, wherein the dimpled portion is plural in number, the plural dimpled portions being aligned with one another.

15. A blade including upper and lower surface doublers in accordance with the doubler of claim 14, wherein the plural dimpled portions of the upper surface doubler are staggered with respect to the plural dimpled portions of the lower surface doubler.

* * * * *